3,737,399
POLYMER FOAMS

John Michael Locke, Minstead, and David Porter, Southampton, England, assignors to The International Synthetic Rubber Company Limited, Southampton, England
No Drawing. Filed Feb. 14, 1972, Ser. No. 225,990
Claims priority, application Great Britain, Feb. 19, 1971, 4,991/71
Int. Cl. C08j 1/18; C08f 47/08
U.S. Cl. 260—2.5 L          30 Claims

ABSTRACT OF THE DISCLOSURE

A process for the preparation of a solid foamed polymer from a hydrogen-peroxide-modified polymer dispersion comprising foaming the dispersion and drying the foamed dispersion during or after cross-linking thereof characterized in that hydrazine is added to the dispersion prior to or during the foaming thereof.

---

This invention relates to a process for the preparation of solid foamed polymers, especially foam rubber.

Solid foamed polymers such as foam rubber may be prepared from a foamed aqueous polymer dispersion, such as a foamed latex, e.g. a synthetic rubber latex, particularly a styrene-butadiene rubber (S.B.R.) latex, by moulding or spreading the foamed dispersion followed by cross-linking or vulcanisation.

It is disclosed in French specification No. 2,061,302 (corresponding to British patent applications Nos. 45,017/69 and 20,499/70) that solid foamed polymers having especially useful properties may be obtained from a hydrogen-peroxide-modified polymer dispersion, i.e. a polymer dispersion obtained by treating a colloidal aqueous dispersion of an unsaturated polymer (a base polymer dispersion) with hydrogen peroxide in the presence of a hydrogen peroxide activator which does not encourage the decomposition of the hydrogen peroxide to produce molecular oxygen under the conditions of treatment.

However, difficulties occur when attempts are made to prepare solid foamed polymers from such modified polymer dispersions in accordance with conventional practice. For example when such modified polymer dispersions are compounded and foamed in the same manner as with conventional polymer dispersions (e.g. an S.B.R. latex), skinning and general processing difficulties occur. Furthemore the resultant foam has a very poor cell structure usually containing many ruptured cells, leading to foam splitting and poor physical properties in the final foam. These problems are especially liable to occur when attempts are made to produce the foams by the so-called Dunlop process.

We have now found that by including hydrazine in the modified polymer dispersion, solid foamed polymers may be readily prepared from such dispersions, and furthermore the solid foamed polymers have exceptionally good cell structure and physical properties with the added advantage of easy processing.

According to the present invention, a process for the preparation of a solid foamed polymer from a hydrogen-peroxide-modified polymer dispersion as defined above comprising:

(1) Foaming the dispersion, and (2) Drying the foamed dispersion during or after cross-linking thereof, is characterized in that (3) Hydrazine is added to the dispersion prior to or during the foaming thereof.

The process of the present invention is particularly applicable to the preparation of foams using gelling agents. Accordingly gelling and cross-linking agents may be added to the modified polymer dispersion. Furthermore such amount, if any, of fatty acid soap as is required to stabilise the modified polymer dispersion is also added thereto.

The modified polymer dispersions are preferably those obtained by modification of natural or synthetic rubber latices. Examples of suitable latices which may be used as base polymer dispersions are latices of polyisoprene; polybutadiene; isoprene-butadiene copolymer; styrene-butadiene copolymer and styrene-isoprene copolymer (the styrene content of the copolymers being up to 70% by weight, typically 20 to 40%); styrene-butadiene copolymers having a styrene content in excess of 70% by weight (including for example so-called high styrene resins); polychloroprene; or a latex of a diene/acrylonitrile copolymer containing, for example 15% to 50% by weight of acrylonitrile. Optionally, any of such latices, particularly styrene/butadiene and butadiene/acrylonitrile copolymer latices, may contain, as comonomer in the polymer, small quantities, e.g. 1% to 10% or more by weight of total monomers, of an unsaturated acid such as acrylic, methacrylic or itaconic acid and/or esters thereof such as methyl methacrylate, ethyl acrylate or hydroxy ethyl methacrylate. Artificial latices derived from solution polymerisations, e.g. of ethylene-propylene-diene terpolymer, are also suitable. The base polymer dispersions may be used alone or in admixture.

When rubbery polymer dispersions are used, these may contain, if desired, a reinforcing non-rubbery polymer dispersion such as a latex of polystyrene, polyvinyl chloride, or so called high styrene resin. Such reinforcing latices may be blended with the rubbery polymer dispersion before or after the modification reaction. The reinforcing latices may be used in widely varying amounts depending on the properties required in the final solid foamed polymer product. Typically, e.g. 5 to 50 parts, more usually 5 to 20 parts, by weight per hundred parts by weight of unsaturated polymer dispersion of such reinforcing latices are used. The process of the present invention is particularly applicable to modified latices of styrene-butadiene rubber, polybutadiene, butadiene acrylonitrile rubber, polychloroprene, and natural rubber, both un-reinforced and reinforced with non-rubbery polymers as described above. Modified latices of styrene-butadiene rubber and of styrene-butadiene rubber reinforced with polystyrene are especially suitable.

Examples of suitable fatty acid soaps that may be added to the modified polymer dispersion in the process of the invention, if required, are the alkali metal salts of organic carboxylic acids having chain lengths of 12 to 18 carbon atoms (laurate to stearate). Salts of monounsaturated acids such as potassium oleate are very suitable. Alternatively an aryl sulphonate such as sodium dodecyl benzene sulphonate may be used. Fatty acid soaps are preferred however. The amount of soap required (if any) is determined by the stability of the modified polymer dispersion and the amount of soap (if any) consumed in the modification reaction. In some cases the modified polymer dispersion may already be sufficiently stable to render unnecessary the addition of extra soap. "Stable" in this context means that the latex is sufficiently resistant to coagulation that coagulation does not occur to any substantial extent when the latex is processed in conventional manner, e.g. by mechanical whipping. In general about 0.5 to 4.0 parts by weight of soap per hundred parts by weight of polymer dispersion (dry weight) is used. The soap is preferably added as an aqueous solution directly to the modified polymer dispersion and thoroughly dispersed therein.

Hydrazine is conveniently used in the process of the present invention in the form of hydrazine hydrate, e.g. in the form of an aqueous solution of concentration desirably at least 50% by weight. Generally, the amount of hydrazine required is in the range 0.075 to 1.0 part per 100 parts of modified polymer dispersion (on a dry weight basis). Higher quantities, e.g. 5.0 parts per 100, may be used but generally offer no advantage, their use being merely wasteful. In some cases, quantities lower than 0.075 part, e.g. 0.01 part, per 100 parts of modified polymer dispersion may give satisfactory products and the use of such lower quantities is included in the present invention. Preferably 0.10 to 0.40 part by weight of hydrazine per 100 parts by weight of modified polymer is used. Preferably at least 24 hours is allowed to elapse between the peroxide modification reaction and the hydrazine addition.

The steps of foaming, gelling or setting and cross-linking, and the agents therefor are well known in the art. Gelling agents, if used, may be of the heat sensitive or delayed action type. The materials concerned are well known and they and the processes in which they are conventionally used are described inter alia in "Latex Foam Rubber" by E. W. Madge, Maclaren & Sons Ltd., 1962. Normally delayed action gelling agents are used in the Dunlop process whilst heat sensitive agents are used in spread foam and moulded slab stock. However, as is known, solid polymer foams may be prepared by processes not requiring gelling agents, the polymer foam being set by drying, i.e. removal of the aqueous phase at elevated temperature, e.g. up to 200° C., provided sufficient stabilising agent is present to maintain the foam structure. Where the base polymer in the modified polymer dispersion contains reactive groups, such as carboxyl or hydroxyl groups, setting may be achieved by means of a co-reactive material such as a melamine-formaldehyde resin which cross-links the polymer through the reactive groups. In such cases, neither gelling agents nor cross-linking agents acting through double bonds in the polymer chains, are required. Other ingredients, in particular fillers, may be included in the polymer dispersion prior to foaming if desired. When fillers are used they may be included in amounts of, for example, up to 150 phr. in the case of gelled spread foams, or up to 40 phr. in the case of "Dunlop" moulded foam. Inclusion of fillers does not detract from the excellent foam structure obtainable and further, results in only a negligible loss in hardness contrary to normal expectation.

By means of the process of the present invention, it is possible to prepare foams by either moulding or spreading the fluid wet foam prior to setting and cross-linking the modified polymer.

When gelling agents are used for producing moulded foam, the gelled foam has a very high wet gel strength enabling the foam to be removed from the mould prior to cross-linking. Cross-linking may be achieved in hot air whilst drying the foam, even after a washing step, enabling the use of expensive metal moulds to be dispensed with.

In our prior British application No. 33,967/69 we have described a process for preparing moulded foams by subjecting a foamed curable rubber latex composition containing a delayed action or heat sensitive gelling system in a closed mould to radio frequency radiation. In general the process described in application No. 33,967/69 is applicable to any latex suitable for the production of latex foams by the so-called Dunlop process, for example, a latex of styrene-butadiene rubber, polybutadiene rubber, polyisoprene rubber, chloroprene rubber, natural rubber, and blends of two or more of such latices.

We have found that the process of the invention is particularly applicable to the preparation of moulded foam by including hydrazine in the modified polymer dispersions as described above and subjecting the foam dispersion in a closed mould to radio frequency radiation to gel the foam rapidly. In this way moulded foams may be readily prepared from modified polymer dispersions. Such products have an exceptionally good cell structure, of a quality not hitherto obtainable, and excellent physical properties, and have the added advantage of being easily processed during production.

Thus in one embodiment of the present invention a process for preparing a moulded foam comprises (1) Adding to a hydrogen-peroxide-modified polymer dispersion (as above defined) such amount, if any, of an anionic emulsifier as is required to stabilise the dispersion, hydrazine, and crosslinking agents, (2) Foaming the dispersion and adding one or more gelling agents, and (3) Subjecting the foamed dispersion in a closed non-metallic mould to radio frequency radiation of an intensity and for a duration to cause gelling, and thereafter curing the gelled foam to produce a solid foamed article.

Generally the frequency of the radiation is at least 20 mc./s., and preferably at least 300 mc./s.

In this embodiment, the gelling agent(s) used may be of the heat-sensitive or delayed action type, as referred to above. However delayed action gelling agents are normally used.

Typical examples of delayed action gelling agents are given in "Latex Foam Rubber" mentioned above. The fluocomplexes such as fluosilicate, fluostannate, fluotitanate and fluozirconate are preferred. These fluocomplexes may be salts of an alkali metal, e.g. sodium or potassium. Salts of sodium are particularly preferred. The most preferred delayed action gelling agent is sodium silicofluoride. The gelling agent or agents may be used in conventional amounts, e.g. 0.05 to 10.0 parts by weight per hundred parts by weight of (dry) polymer (phr.), although in view of the rapid rise in temperature obtainable in this process for preparing a moulded foam, lower amounts, preferably of 1.00 to 4.00 phr., are generally used. As is known in the art, the quantities to be used in any particular instance depend on the size of the moulded article, on the amount and type of soap, and on the amount and type of filler and of the gel sensitiser when such materials are present.

Heat sensitive gelling agents are likewise well known, typical examples being given in "Latex Foam Rubber" referred to above. The most common of these is one wherein zinc ions, for example from zinc oxide, are used in combination with an ammonium salt, e.g. ammonium acetate or nitrate. Zinc oxide is generally used in an amount of 2 to 10 phr. (e.g. 4 to 6 phr.), the amount of ammonium acetate being adjusted to obtain the required gelation time.

In preparing latex compositions for use in the embodiment for preparing a moulded foam, it is desirable to select the type and amount of gelling agents such that a substantial delay in gelling occurs at room temperature, since this gives the optimum gelling speed at higher temperatures as reflected in the processing and product physical properties. Accordingly the compounded latex composition preferably has a gelling time at room temperature (25° C.) (cold gel time) of at least 10 minutes (e.g. 10 to 20 minutes), more preferably at least 15 minutes. During this time, no or only a very slight, increase in viscosity occurs. However in spite of the longer delayed action at ambient temperatures, gelling can still occur in e.g. 5 to 20 seconds by applying radio frequency radiation. A further advantage of this embodiment for preparing a moulded foam is that the tendency to form surface defects is reduced as compared with a modified Dunlop (moulded foam) process where steam is employed to accelerate gelling.

In conventional processes for preparing moulded foam, gelling in the mould is normally carried out at a mould temperature of approximately 30° C. to 35° C. or slightly above e.g. 40 to 50° C. although higher temperatures, e.g. 70 to 80° C. may be used. Where a delayed action gelling system is used in such conventional processes, gelling is normally arranged to occur within 3 to 8 minutes from addition of the gelling agent. This delay is sufficient to permit refining of the compounded latex for 1 to 1½ minutes (where a planetary mixer is used) and filling and closing of the mould without undue risk of premature gelation. Provision for longer delay to reduce risks of premature gelation is economicaly undesirable since the mould is consequently occupied for longer, thereby lowering production rates. However, when a heat sensitive gelling system is used in such conventional processes, there is little effect upon the stability of the latex at room temperature, but above a temperature of, e.g. 40° C., rapid gelation of the latex occurs. Heat sensitive gelling systems have however several disadvantages and for this reason delayed action systems find much wider application, especially where comparatively thick (e.g. more than 2 cm.) products are to be prepared.

When radio frequency radiation is applied to a latex composition containing a gelling agent, extremely rapid gelation can be obtained, e.g. within five to fifteen seconds. By causing gelation considerably more rapidly than in conventional processes, a markedly improved structure is obtained in the final foamed article after curing. This excellent structure is obtained even when similar or greater quantities of fillers are used than is generally the case in the Dunlop process. The application of radio frequencies to latex compositions causes considerable internal heating on account of the substantial quantities of water present. Because of this water, the composition has a high loss factor and rapid energy absorption occurs, particularly where high frequencies are employed, with consequent rapid gelling.

The radio frequency radiation may generally have a frequency of at least 20 megacycles per second (mc./s.). Radio frequencies, giving rise to dielectric heating, e.g. in the range 20 to 80 mc./s., can be used, particularly when a series of articles of standard size is to be produced. However dielectric heating has the disadvantage that it must be applied by means of two electrodes accurately spaced on opposite sides of the latex composition in the mould, since the power imparted to the foamed composition is dependent on the electrode spacing. Accordingly changes in the shape of the articles to be prepared from the latex require adjustments of the electrodes, causing appreciable inconvenience in production. It is therefore generally preferred to employ what is normally referred to as microwave radiation of which the frequencies are substantially higher, e.g. 300 to 300,000 mc./s. normally at least 800 mc./s. When using a microwave radiation source, the radiation can be contained within a closed space of sufficient size to contain the mould. The energy absorbed per unit volume of the latex composition is not dependent on the shape of the foamed latex article being gelled, and accordingly articles of differing shapes can readily be produced without time consuming adjustments being needed. Normally, microwave frequencies are of the order of 800 to 2500 mc./s. but frequencies outside this range are also useful.

Frequencies of 900 mc./s. and 2450 mc./s. are two frequencies in the higher range allocated by British law and internationally assigned for industrial purposes, although from the practical point of view other frequencies are equally useful. There is no apparent difference in the process used or product obtained at 900 mc./s. compared with 2450 mc./s. although at the higher frequency more care must be taken to avoid the danger of stray radiation contacting operating personnel. This necessitates a complex system of gates if continuous operation is to be achieved. Power required depends on the batch weight. Commonly the power required is in the range 0.5 kw. to 200 kw. or more. Care must be taken in selecting the intensity of the radiation since too rapid a heating arising from the use of too intense a radiation may lead to inferior products. Preferably the intensity of the radiation is such that approximately 1.5 to 2.3 kilowatt per kilograms (kw./kg.) of latex composition is applied although intensities outside these limits, e.g. 0.5 to 5 kw./kg., may in some cases be suitable.

The radio frequency radiation used for gelling the foam is preferably also used for curing the gelled foam, although curing by conventional means, e.g. by steam heating may be used. It is particularly convenient to have a continuous process in which the radio frequencies first gel the compounded latex composition and then cure the gelled latex to a solid article. When radio frequencies are employed for curing, the cure times are of the order 2 to 6 minutes, depending on the intensity of radiation applied. The mould containing the gelled compound remains closed during the curing step. The mould used in the process of the present invention is non-metallic and it does not absorb microwaves to any great extent. Generally the mould should not be completely transparent to the applied radiation but it is desirable that the mould material has a loss factor lower than the loss factor of the latex composition at the frequency of the applied radiation. Generally the loss factor is lower than e.g. 0.5, commonly 0.05 to 0.15. Examples of suitable materials are wood, glass fibre, reinforced polyester, reinforced phenolic resin or a mixture of these. A combination of glass reinforced polyester as the major material with an asbestos reinforced phenolic resin as the mould lining has been found to give very good results. It is generally desirable to preheat the mould uniformly to e.g. 50° C. to 70° C. since this causes a surface skin to form an optimum surface finish is obtained. After curing, the article is removed from the closed mould and dried, e.g. by use of hot air. In addition to gelling agents, the compositions normally contain a gel sensitiser, suitably in an amount of up to 1.5 phr., preferably 0.1 to 1.0 phr. Typical gel sensitisers are the guanidines, such as diphenyl guanidine and diortho tolyl guanidine. Other sensitisers that may be used are the polyamines such as ethylene formaldehyde amine. Such a material is sold under the trademark "Vulcafor EFA" by I.C.I. Limited.

The composition generally includes sulphur for curing the gelled latex, suitably in an amount of from 0.1 to 5.0 phr., preferably 0.5 to 3.0, and most preferably 1.0 to 2.0 phr. The amount required is generally lower than that required for conventional foam systems and this leads to improved physical properties in the product.

In general accelerators such as zinc diethyl dithiocarbamate (ZDC) and zinc mercaptobenzthiazole (ZMBT) are used. Suitably, in most applications, amounts approximately equal to those of the sulphur are included in the composition. Thus the total amount of accelerator may be e.g. from twice to half of the amount of sulphur present.

This embodiment for preparing a moulded foam enables substantial quantities of fillers to be included in the composition while still providing good properties in the final cured foam. Typical fillers are Claysil (trademark), china clay, whiting, silica, silicates and carbon black. The composition prior to foaming may contain filler(s) in an amount of up to e.g. 75 parts by weight phr., though it is preferable to use from 10 to 40 parts by weight phr., and more preferably 20 to 40 parts by weight phr., since at higher filler loadings the surface appearance of the product may not be so good. Such materials do not affect the loss factor of the latex composition to any significant extent since water having a high loss factor is present in relatively large amounts.

As an example of a method of practising this embodiment for preparing a moulded foam, a latex composition comprising a modified rubber dispersion, emulsifier, hydrazine, sulphur, accelerator, antioxidant and fillers is foamed to the required density by conventional means, for example in a continuous mixer (e.g. Oakes machine), or a planetary batch mixer (e.g. Hobart). Before foaming it is desirable to mature the latex composition for a period of e.g. 24 to 48 hours to reduce the risk of surface skinning on moulding, especially when filler loadings of e.g. 20 to 40 phr. or higher are being used. When the foamed compoistion has the required density, the zinc oxide, gel sensitiser and delayed action gelling agent are added to the foaming machine, and the mixture refined for e.g. 1 to 2 minutes (when a planetary mixer is used).

The foamed composition containing gelling agent is transferred to the mould, which is filled, closed and placed in e.g. a microwave unit where radio frequency radiation, (e.g. microwave radiation) is applied for approximately four minutes.

In the first 10 to 20 seconds the foam is caused to gel, and curing proceeds over the remaining time. Following completion of the cure, the mould is opened, and the cured foam article is removed and dried e.g. in hot air.

As mentioned above, the term "modified polymer dispersion" means a polymer dispersion obtained by treating a colloidal aqueous dispersion of an unsaturated polymer with hyrogen peroxide in the presence of a hydrogen peroxide activator which does not encourage the decomposition of the hydrogen peroxide to produce molecular oxygen under the conditions of treatment. The process of preparing such modified polymer dispersions is described in French specification No. 2,061,302 and it does not constitute part of the present invention.

One such process is now described in which hydrogen peroxide is used as a 30% by weight aqueous solution known in the art as "100 vol" hydrogen peroxide. The amount of hydrogen peroxide per 100 g. of unsaturated polymer dispersion (on a dry weight basis), is desirably in the range 0.5 to 10 ml., preferably 1.0 to 4.0 ml. of "100 vol" hydrogen peroxide. The hydrogen peroxide activator present is an inorganic compound which reacts with hydrogen peroxide in the aqueous medium. For example, the activator may be one which reacts with hydrogen peroxide in an aqueous medium to produce a per-acid or per-salt. It may be, for example, an acidic or amphoteric inorganic oxide or salt thereof such as a sodium or potassium salt, for example, a molybdate, a tungstate, stannate, borate, pervanadate, metasilicate, (preferably used in conjunction with potassium hydroxide), aluminate, or bicarbonate or lithium chloride, or boric acid. Sodium tetraborate, and especially sodium tungstate ($Na_2WO_4.2H_2O$), are preferred activators. The amount of activator used may be as little as one millimole per mole of hydrogen peroxide. In some cases, the aqueous polymer dispersion may already contain sufficient activator as a result of the method of preparation used in which case no additional activator is required. The activator is suitably added to the unsaturated polymer as an aqueous solution or suspension.

The treatment of the unsaturated polymer dispersion in this process for preparing modified polymer dispersions may take place in air and may conveniently be performed at room temperature (e.g. 20° C.), although temperatures of up to e.g. 60° C. may be used. Treatment may take place without agitation although gentle agitation is preferred. Preferably the treatment takes place under conditions which minimise loss of oxygen. For example, when the treatment is used for a natural rubber latex, it has been found advantageous to include a small quantity, e.g. from 0.05 to 0.2% by weight of the rubber, of a metal ion complexing agent such as the disodium salt of ethylene diamine tetraacetic acid (E.D.T.A.) to sequester any metal ions (such as copper and manganese ions) present in the latex which would otherwise cause rapid decomposition of the hydrogen peroxide to molecular oxygen. Such decomposition is detected by foaming of the latex. The modification reaction is carried out for a period which varies depending on the polymer dispersion being treated and which may be, for example, 9 to 30 hours. When the reaction is complete, the peroxide level in the polymer dispersion is reduced to very small amounts, usually less than 0.5 ml. and preferably less than 0.02 ml. "100 vol" peroxide per litre of latex. Desirably, when residual peroxide in a sample of the latex is decomposed with yeast under constant temperature conditions and the oxygen evolved measured, the oxygen evolved corresponds to less than 0.02 ml. of "100 vol" peroxide per litre of latex. After treatment, a dithiocarbamate salt, such as zinc diethyl dithiocarbamate or sodium diethyl dithiocarbamate, or ethanolamine is desirably dispersed in the modified polymer dispersion. Suitable amounts of such compounds are 0.014 g. to 1.4 g. per 100 g. dry weight of polymer dispersion typically about 0.14 g. per 100 g. As a result of the treatment, modified polymer dispersions have a very high film strength. This high film strength relative to the strength of the films prepared from the base (unmodified) polymer dispersion is evidence of satisfactory treatment.

We believe that residual peroxide in the modified polymer dispersion is one reason for the difficulties referred to above which occur when attempts are made to prepare solid foamed polymers from modified polymer dispersions in accordance with conventional practice. We have found that the process of the present invention offers completely unexpected improvements and enables rapid and efficient production of moulded foams. Furthermore the foams so produced have excellent structure and physical properties. A further advantage is that the incorporation of flame-retardant agents such as polyvinyl chloride and/or antimony oxide is greatly facilitated compared with unmodified polymer dispersions enabling flame-retardant foams to be prepared readily, the excellent physical properties and structure in the final foamed polymer being maintained.

Attempts made to remove residual peroxide in modified polymer dispersions in other ways, for example by prolonged heating (which decomposes hydrogen peroxide) or by addition of yeast (which reacts with hydrogen peroxide) have not yielded similar improvements.

The gelled foam has a very high wet gel strength and if desired, it is possible for the foam to be removed from the mould prior to cross-linking in which case cross-linking may be achieved in hot air whilst drying the foam. The uncured gelled foam can be washed and then mangled with little or no permanent deformation. It is however generally preferred to cure the gelled foam in the mould.

Spread foams and moulded foams produced by the process of the present invention, may be used in a wide variety of applications for example in upholstery, carpet backing, undergarments, cushions, mattresses and as a binder for curled hair. The cell structure of the foam in each case is excellent.

Some preferred embodiments in accordance with the present invention will now be described by way of example.

EXAMPLE 1

A modified polymer dispersion, in this case a modified rubber latex, was prepared by treating 100 mls. of Intex (registered trademark) 105, a reinforced cold polymerised butadiene-styrene copolymer latex prepared in emulsion using potassium oleate emulsifier, of 65% total solids content, with 2.0 mls. of 100 vol. hydrogen peroxide in the presence of 0.2 g. of a 25% solution of sodium tungstate ($Na_2WO_4.2H_2O$) at 20° C. with gentle stirring until the residual peroxide level was less than 0.002 ml. of 100 vol. hydrogen peroxide (using the "yeast" test hereinbefore described).

100 parts of this latex were treated with 0.5 parts (dry) of a 10% potassium oleate solution which was thoroughly dispersed in the latex before the addition of 0.246 parts (2.5 g. per litre of latex) of a 64% solution of hydrazine. The mixture was allowed to stand at 30° C. for one hour.

Samples of the above latex containing hydrazine (latex A) of the unmodified latex Intex 105 (latex B) and of the above modified latex but with the emission of hydrazine (latex C), were compounded with gelling and vulcanisation agents to the following formulation in which the solids content of the dispersion or solution of each compound is indicated in parentheses.

|  | Parts |
|---|---|
| Latex | (65%) 100.0. |
| Sulphur | (50%) 2.0. |
| Zinc dithio carbamate | (50%) 1.0. |
| Zinc mercapto benzthiazole | (50%) 1.0. |
| Antioxidant | (33%) 1.0. |
| Zinc oxide | (50%) 3.0. |
| Diphenyl guanidine | (25%) 0.3. |
| Sodium silicofluoride (SSF) | (25%) As required.[1] |

[1] Approx. 2.75 phr. of SSF was required for gelling at room temperature. Lower amounts are required for gelling at higher temperature.

The latices were foamed to a density of approximately 0.1 g./cm.$^3$ before moulding, gelling at room temperature and vulcanising (cross-linking) the foams in steam.

The properties of foams from the modified latex containing hydrazine (Latex A) and the unmodified latex Intex 105 (Latex B) are given below.

|  | Latex A | Latex B (for comparison) |
|---|---|---|
| Elongation (percent) | 160 | 180 |
| Tensile strength | 0.98 [1] / 14 [2] | 0.42 [1] / 6 [2] |
| Compression modulus index (×10$^3$) 25% | 18.0 | 12.4 |
| (Force required for percent compression÷(foam density) 2.5 40% | 26.0 | 18.0 |

[1] Kg./cm.$^2$
[2] P.s.i.

The processing properties and final foam structure of the modified latex containing hydrazine (in accordance with the invention (Latex A)) were superior to those of the unmodified latex (Latex B). Latex C, the modified latex containing no hydrazine, was difficult to process and gave very poor foams with much reduced physical properties.

Addition of soap (0.5 phr. dry) and hydrazine (0.246 g. dry) to latex B in the same manner as described above gave no detectable alteration in properties.

EXAMPLE 2

A modified rubber latex containing hydrazine was prepared as described in Example 1, except that the peroxide amount used in the modification reaction was 12 mls. per litre of latex.

Samples of this modified latex and the unmodified latex (Intex 105) were compounded as in Example 1, except that a filler (Claysil 315/2) in amounts of 10 phr. and 20 phr. was included.

The results are given below together with the results from latex foams containing no filler.

| Filler level, phr. | Foam density, g./cm.$^3$ | Compression modulus index at— 25% | 40% | 50% |
|---|---|---|---|---|
| Modified latex: | | | | |
| 0 | 0.094 | 16.7 | 23.9 | 10.1 |
| 10 | 0.090 | 15.1 | 22.9 | 9.6 |
| 20 | 0.093 | 13.7 | 21.8 | 9.2 |
| Unmodified latex: | | | | |
| 0 | 0.096 | 9.59 | 20.7 | 10.4 |
| 10 | 0.101 | 7.4 | 15.6 | 7.9 |
| 20 | 0.104 | 6.8 | 14.5 | 7.7 |

The tensile strength and elongation properties of the two series of foams were substantially the same.

As before, the modified latex containing hydrazine was processed without difficulty and gave foams of superior physical properties to those from the unmodified latex.

EXAMPLE 3

Latices as in Example 1 with the omission of hydrazine, were compounded to the following formulation (parts are parts dry weight):

| | |
|---|---|
| Base latex | (65%) 100.0. |
| Hydrazine | See table below. |
| Potassium oleate soap | (10%) 3.0. |
| Sulphur | (50%) 2.0. |
| ZDC | (50%) 1.5. |
| ZMBT | (50%) 1.5. |
| Antioxidant | (33%) 1.0. |
| Whiting Grade 3ML | (100%) 75.0. |
| Ammonia | (25%) 0.6. |
| Zinc oxide | (50%) 5.0. |
| Ammonium acetate | (20%) As required. |

Each latex compound was foamed to the required density using a planetary mixer. The speed of mixing was reduced and ammonium acetate added. Stirring at low speed was continued for 1 minute to allow the ammonium acetate to mix thoroughly.

Each sensitized foam was spread onto hessian and gelled under infra-red heat before curing at 140° C.

The following results were obtained:

| | Latex sample | | |
|---|---|---|---|
| | D (as B above) | E | F |
| | unmodified (for comparison) | modified latex | modified latex |
| Peroxide level (100 vol.) used in modification reaction, mls./l. | | | |
| | 0 | 20 | 20 |
| Hydrazine (64%), gms. /l | 0 | 0 | 2.5 |
| Density (gm./cm.$^3$) | 0.152 | 0.168 | 0.185 |
| Tensile strength (p.s.i.) | 8.35 | 9.3 | 14.2 |
| E at B (percent) | 95 | 65 | 80 |
| Compression modulus (gm./cm.$^2$): | | | |
| 25% | 86 | 100 | 140 |
| 40% | 144 | 200 | 248 |
| 50% | 241 | 324 | 400 |
| Resilience (percent) | 43 | 45 | 49 |
| Tensile index | 1,514 | 1,532 | 2,125 |
| Structure | Feathery | Feathery | Regular |

Physical properties of the foam containing hydrazine (F) are much superior to either sample (E) or the unmodified latex (D) neither of which contained hydrazine. In addition processing was considerably easier and strict control of the gelling step was not required.

EXAMPLE 4

This example illustrates one embodiment of the present invention wherein moulded foam is prepared using radio frequency radiation to cause gelling of the foamed polymer dispersion.

A modified polymer dispersion, in this case a modified rubber latex, was prepared by treating 1 litre of Intex (registered trademark) 105 (a reinforced cold polymerised butadiene-styrene copolymer latex prepared in emulsion using potassium oleate emulsifier, of 65% total solids content) with 20 mls. of 100 vol. hydrogen peroxide in the presence of 0.5 gms. (dry weight) of a 2.5% solution of sodium tungstate ($Na_2WO_4 \cdot 2H_2O$) at 20° C. with gentle stirring for 24 hours by which time the residual peroxide level was less than 0.002 ml. of 100 vol. hydrogen peroxide. This was confirmed by decomposition of the residual peroxide in a sample of the latex using yeasts under constant temperature conditions, measuring the oxygen evolved and hence, determining the peroxide concentration.

0.5 part (dry weight) of a 10% potassium oleate aqueous solution was thoroughly dispersed in 100 parts (dry) of this latex and 0.385 part of hydrazine hydrate (99%) added. The mixture was allowed to stand at 30° C. for one hour before compounding to the following formulation in which the solids contents of the dispersion or solution of each compound is given in parentheses:

|  | Parts dry weight |
|---|---|
| Modified Intex 105 mixture as above (65%) | 100.885 |
| Sulphur (50%) | 2.0 |
| Zinc dithio carbamate (50%) | 1.0 |
| Zinc mercaptobenzthiazole (50%) | 1.0 |
| Liquid phenolic antioxidant (Nonox[1] WSL) (33%) | 1.0 |
| Zinc oxide (50%) | 3.0 |
| Diphenyl guanadine (25%) | 0.5 |
| Sodium silico fluoride (25%) | 2[2] |

[1] Nonox is a trademark of I.C.I. Ltd.
[2] Sufficient amount was added after foaming to give a gel time of approximately 15 minutes at 20° C. (cold gel time).

The compound was foamed in a planetary mixer to a density of approximately 0.08 g./cm.$^3$ before mixing in the sodium silico fluoride, then poured into a glass fibre reinforced polyester mould. Immediately on closing the lid of the mould, the mould was placed in a microwave unit. In this example an English Electric type 120 PMV 3B Machine was used at a frequency of 2450 mc./s. and a power of approximately 1.5 to 2.3 kilowatts/kg. of latex compound was applied. The foam in the mould was found to be satisfactorily gelled and vulcanised after 5 minutes under these conditions. A small sample of the latex compound retained at 20° C. gelled after 18 minutes.

The physical properties of this foam are given in column A of the table. The structure of this foam was excellent and remarkably even.

A comparison foam was prepared using the formulation above, except that an unmodified latex (i.e. Intex 105) was used and hydrazine was omitted. The foamed compound was gelled at room temperature and the foam was vulcanised in steam.

The properties of this comparison foam are given in column B of the table. The structure of this comparison foam was far inferior to that of the foam prepared according to the invention having many large voids and being very uneven.

|  | A | B (for comparison) |
|---|---|---|
| Elongation (percent) | 230 | 180 |
| Tensile strength (p.s.i.) | 12.0 | 7.0 |
| Compression modulus index at 40% | 750 | 480 |

NOTE.—Compression modulus index at 40% is calculated as $$\frac{\text{the force required for 40\% compression}}{(\text{foam density})^{2.5}}$$

when measured using a 12" diameter indentor.

The excellent structure and physical properties of latex foam composition, (A), show clearly the advantages obtained by the use of the process of the present invention.

EXAMPLE 5

Portions of the base latex described in Example 1 were treated with varying amounts of hydrogen peroxide using sodium tungstate as activator at a concentration of 0.5 g./litre and 1.0 g./litre (as shown below). The treatment procedure was essentially as described in Example 1. After treatment, a 10% solution of potassium oleate was used to adjust stability of the latex portions where required. Hydrazine (as hydrate) in the amounts shown based on hydrate was added to each, the latex compounded as in Example 1 and the properties of the moulded foams measured. The results were:

(1) Tungstate=0.5 g./litre; Hydrazine=1.5 g./litre

| H$_2$O$_2$, g./litre | Foam density | Tensile strength | Compression modulus index at— | | |
|---|---|---|---|---|---|
|  |  |  | 25% | 40% | 50% |
| 4.0 | 0.116 | 12.6 | 8.5 | 17.3 | 9.2 |
| 8.0 | 0.108 | 11.9 | 15.8 | 22.8 | 10.2 |
| 14.0 | 0.106 | 15.7 | 18.0 | 25.9 | 11.2 |

(2) Tungstate=0.5 g./litre; Hydrazine=2.5 g./litre

| 4.0 | 0.109 | 8.85 | 8.5 | 17.4 | 9.7 |
|---|---|---|---|---|---|
| 8.0 | 0.106 | 10.2 | 12.6 | 20.0 | 9.4 |
| 14.0 | 0.103 | 14.6 | 16.0 | 24.8 | 10.7 |
| 20.0 | 0.103 | 15.2 | 18.3 | 27.3 | 11.2 |

(3) Tungstate=1.0 g./litre; Hydrazine=1.5 g./litre

| 4.0 | 0.104 | 9.45 | 20.3 | 17.9 | 8.9 |
|---|---|---|---|---|---|
| 8.0 | 0.110 | 12.50 | 13.5 | 21.0 | 10.1 |
| 14.0 | 0.101 | 14.1 | 17.3 | 25.2 | 11.3 |
| 20.0 | 0.093 | 12.8 | 19.8 | 28.6 | 11.8 |

(4) Tungstate=1.0 g./litre; Hydrazine=2.5 g./litre

| 4.0 | 0.110 | 10.57 | 8.3 | 17.5 | 10.2 |
|---|---|---|---|---|---|
| 8.0 | 0.107 | 12.07 | 14.2 | 22.0 | 9.4 |
| 14.0 | 0.096 | 12.9 | 18.7 | 26.2 | 10.2 |
| 20.0 | 0.097 | 15.7 | 17.5 | 25.4 | 10.8 |

EXAMPLE 6

A portion of the base latex described in Example 1 was treated with 12 mls./litre of hydrogen peroxide and 0.5 g./litre of sodium tetraborate as activator using the procedure essentially as described in Example 1. Portions of the latex were treated with hydrazine hydrate in the amounts shown (based on hydrate), the latex compounded as in Example 1 and the properties of the moulded foam measured. The results were:

| Hydrazine, g./litre | Foam density | Compression modulus at— | | | Tensile strength |
|---|---|---|---|---|---|
|  |  | 25% | 40% | 50% |  |
| 1.5 | 0.09 |  |  |  | 6.8 |
| 2.5 | 0.09 | 12.3 | 19.1 | 8.1 | 10.3 |
| 5.0 | 0.091 | 12.4 | 20.4 | 8.8 | 8.0 |
| 10.0 | 0.091 | 12.0 | 19.6 | 8.4 | 9.42 |

The foam structure was best at hydrazine levels of 1.5 or 2.5 g./litre, becoming coarser as hydrazine levels increased.

EXAMPLE 7

Modified latex F of Example 3 containing 2.5 g./litre of latex of hydrazine (64%) was compounded to a non-gel formulation as follows:

| Latex | (65%) | 100 |
|---|---|---|
| "Aerosol" 18 surfactant | (35%) | 4.5 |
| Sodium lauryl suplhate | (30%) | 2.5 |
| Sulphur | (50%) | 2.0 |
| Z.D.C. | (50%) | 2.0 |
| Zinc oxide | (50%) | 5.0 |
| Antioxidant | (50%) | 1.0 |
| Whiting | (100%) | 175.0 |
| Sodium hexametaphosphate | (20%) | 1.0 |

Spread foams prepared from this formulation gave essentially the same improvements in the compression modulus characteristics as obtained with latex F of Example 3. The processing characterics were also good.

What is claimed is:

1. A process for the preparation of a solid foamed polymer from a hydrogen-peroxide-modified natural or synthetic rubber latex dispersion comprising foaming the dispersion and drying the foamed dispersion during or after cross-linking thereof characterised in that hydrazine is present during the foaming thereof.

2. A process according to claim 1 wherein the hydrazine is used in an amount of 0.075 to 1 part by weight per hundred parts of modified polymer dispersion (phr.), on a dry weight basis.

3. A process according to claim 2 wherein the hydrazine is used in an amount of 0.10 to 0.40 part by weight per hundred parts of modified polymer dispersion, on a dry weight basis.

4. A process according to claim 1 wherein the hydrazine is used as hydrazine hydrate ($NH_2NH_2.H_2O$).

5. A process according to claim 1 wherein at least 24 hours is allowed to elapse between the peroxide modification reaction and the addition of the hydrazine.

6. A process according to claim 1 wherein a dithio carbamate salt or ethanolamine is dispersed in the modified polymer dispersion.

7. A process according to claim 6 wherein a dithiocarbamate salt selected from zinc diethyl dithio carbamate and sodium diethyl dithio carbamate is used.

8. A process according to claim 6 wherein the amount of dithiocarbamate salt or ethanolamine used is 0.014 to 1.4 parts per hundred parts dry weight of polymer dispersion.

9. A process according to claim 1 wherein a fatty acid soap or an aryl sulphonate is dispersed in the modified polymer dispersion during or after the polymer modification reaction stage.

10. A process according to claim 9 wherein the material used is potassium oleate.

11. A process according to claim 9 wherein the amount of soap used is 0.5 to 4.0 parts per hundred parts of polymer dispersion based on dry weights.

12. A process according to claim 1 wherein one or more gelling agents is/are dispersed in the polymer dispersion.

13. A process according to claim 1 wherein a filler is blended with the polymer dispersion prior to foaming.

14. A process for preparing a gelled spread foam according to claim 13 wherein up to 40 parts by weight phr. of filler is used.

15. A process for preparing a moulded foam according to claim 13 wherein up to 150 parts by weight phr. of filler is used.

16. A process according to claim 1 wherein the modified polymer dispersion is derived from polyisoprene; polybutadiene; an isoprene-butadiene copolymer; a styrene-butadiene rubber; a styrene-isoprene rubber; polychloroprene; a styrene-butadiene-vinyl pyridine terpolymer; a butadiene-acrylonitrile copolymer; an isoprene-acrylonitrile copolymer; an ethylene propylene diene terpolymer; or such polymers or copolymers containing 1% to 10% by weight of total monomers of one or more unsaturated acids and/or esters thereof.

17. A process according to claim 16 wherein the modified polymer dispersion is derived from styrene-butadiene rubber; polybutadiene; butadiene-acrylonitrile rubber; polychloroprene; or natural rubber.

18. A process according to claim 1 wherein the modified polymer dispersion contains a reinforcing non-rubbery polymer dispersion.

19. A process according to claim 18 wherein the modified polymer dispersion is derived from a styrene-butadiene rubber latex containing polystyrene as reinforcing agent.

20. A process for preparing moulded foam according to claim 12 wherein after foaming, the foamed dispersion is subjected in a closed non-metallic mould to radio frequency radiation of an intensity and for a duration to cause gelling.

21. A process according to claim 20 wherein the gelled dispersion is also cross-linked by means of the radio frequency radiation.

22. A process according to claim 20 wherein the mould is heated prior to filling with the latex composition.

23. A process according to claim 20 wherein the frequency of the radiation is 20 mc./sec. to 80 mc./sec.

24. A process according to claim 20 wherein the frequency of the radiation is 300 to 300,000 mc./sec.

25. A process according to claim 24 wherein the frequency is 800 to 2500 mc./sec.

26. A process according to claim 20 wherein the intensity of the radiation is 0.5 to 5.0 kw. per kilogramme of foamed dispersion.

27. A process according to claim 26 wherein the intensity of the radiation is 1.5 to 2.3 kw. per kilogramme.

28. A process according to claim 20 wherein the mould is made of a material having a loss factor lower than the loss factor of the foamed dispersion measured at the frequency of radiation.

29. A process according to claim 1 wherein the modified polymer dispersion is prepared using at least 0.4 grams/litre of sodium tungstate as activator, and at least 8 mls./litre of hyrogen-peroxide.

30. A process according to claim 29 wherein 0.5 grams/litre of sodium tungstate and 20 mls./litre of hydrogen peroxide are used.

References Cited
UNITED STATES PATENTS

| | | | |
|---|---|---|---|
| 2,529,885 | 11/1950 | Sears | 260—2.5 L |
| 2,734,875 | 2/1956 | Lenny et al. | 260—2.5 L |
| 2,939,852 | 6/1960 | Schmidle | 260—2.5 L |
| 3,215,651 | 11/1965 | Sekhar et al. | 260—2.5 L |
| 2,617,840 | 11/1952 | Eckert | 260—2.5 L |

MURRAY TILLMAN, Primary Examiner

M. FOELAK, Assistant Examiner

U.S. Cl. X.R.

260—17.4 BB, 23.7 A, 23.7 M, 29.7 MN, 41.5 R, 723, 750, 754, 762